(12) United States Patent
Salas Peralta

(10) Patent No.: US 7,186,161 B2
(45) Date of Patent: Mar. 6, 2007

(54) REAL CONSTRUCTION GAME (RCG)

(76) Inventor: Americo Salas Peralta, Avenida Venezuela P3-B Urb., Cusco (PE)

( * ) Notice: Subject to any disclaimer, the term of this patent is extended or adjusted under 35 U.S.C. 154(b) by 0 days.

(21) Appl. No.: 11/056,076

(22) Filed: Feb. 11, 2005

(65) Prior Publication Data

US 2006/0183406 A1    Aug. 17, 2006

(51) Int. Cl.
*A63H 33/08* (2006.01)
(52) U.S. Cl. ............... 446/108; 446/110; 446/476; 52/236.3
(58) Field of Classification Search ........... 446/108, 446/109, 110, 111, 112–116, 123, 124, 476–478, 446/479–482
See application file for complete search history.

(56) References Cited

U.S. PATENT DOCUMENTS

| 1,510,326 | A | * | 9/1924 | Locke | 52/92.1 |
| 1,569,066 | A | * | 1/1926 | Beiger | 446/108 |
| 1,845,254 | A | * | 2/1932 | Fancher | 446/110 |
| 2,073,781 | A | * | 3/1937 | Calafati | 52/275 |
| 2,708,329 | A | * | 5/1955 | McKee | 52/286 |
| 3,343,297 | A | * | 9/1967 | Valentine | 446/109 |
| 3,996,693 | A | * | 12/1976 | Walmer | 446/105 |
| 4,216,608 | A | * | 8/1980 | Walmer et al. | 446/110 |
| 4,521,203 | A | * | 6/1985 | Rothenberg, Jr. | 446/106 |
| 5,217,402 | A | * | 6/1993 | Gross et al. | 446/1 |
| 5,250,001 | A | * | 10/1993 | Hansen | 446/104 |
| 5,359,816 | A | * | 11/1994 | Iacouides | 52/274 |
| 5,498,188 | A | * | 3/1996 | Deahr | 446/75 |
| 5,580,294 | A | * | 12/1996 | Briant | 446/110 |
| 6,073,404 | A | * | 6/2000 | Norfleet | 52/236.3 |
| 6,565,413 | B2 | * | 5/2003 | Brownrigg | 446/476 |
| 6,923,705 | B2 | * | 8/2005 | DeSalvo et al. | 446/106 |
| 7,014,524 | B2 | * | 3/2006 | Farmer Brock et al. | 446/82 |

* cited by examiner

*Primary Examiner*—Nini F. Legesse
(74) *Attorney, Agent, or Firm*—Defillo & Associates, Inc; Evelyn A. Defilló

(57) ABSTRACT

The present invention concerns a construction game to make buildings at a reduced scale providing the user with all the necessary elements in order to obtain a sample at real scale.

11 Claims, 4 Drawing Sheets

THE REAL CONSTRUCTION GAME (RCG)

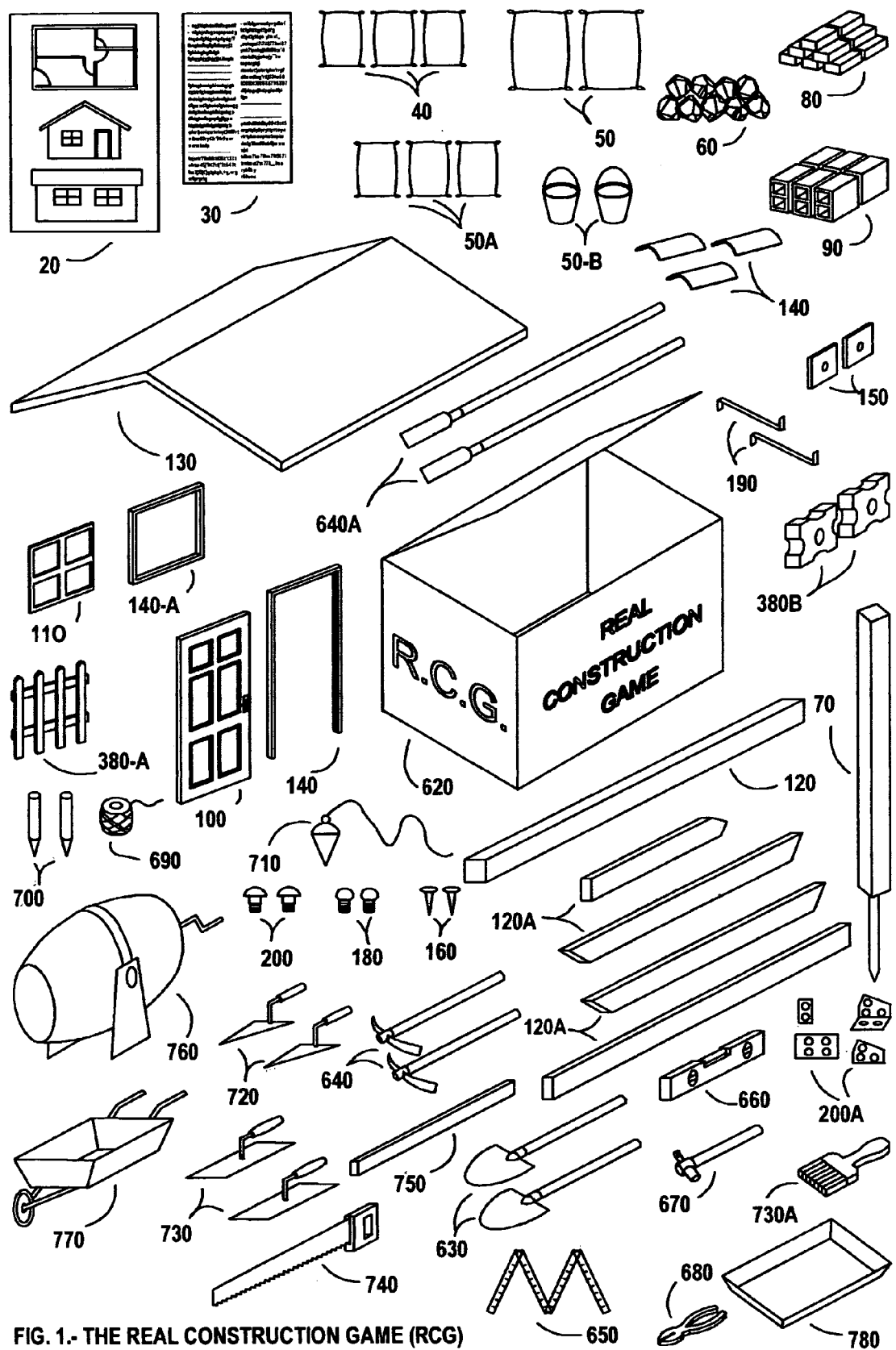
FIG. 1.- THE REAL CONSTRUCTION GAME (RCG)

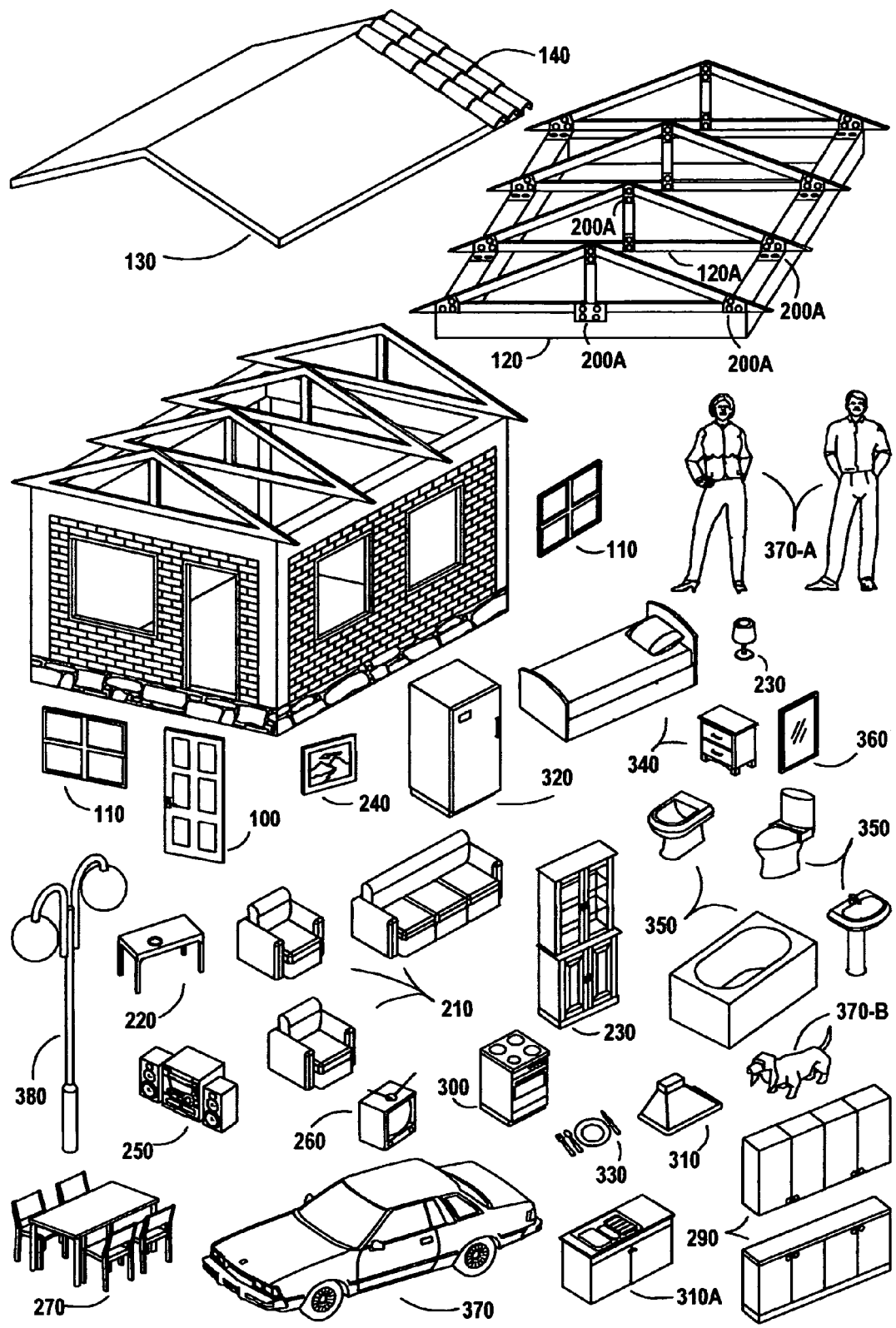
FIG. 2.- THE REAL CONSTRUCTION GAME (RCG) FOR A BRICK AND CEMENT RESIDENCE

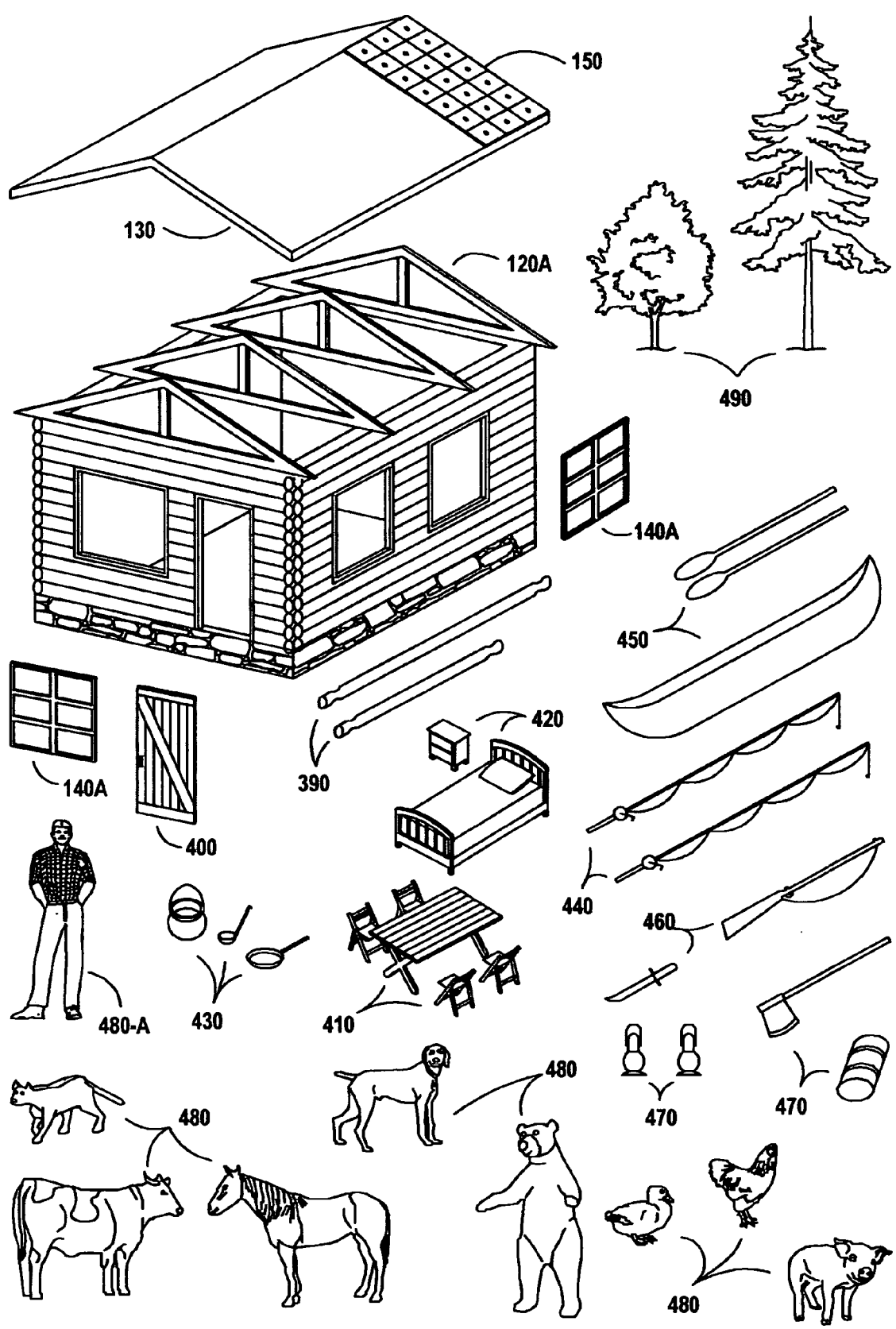
FIG. 3.- THE REAL CONSTRUCTION GAME (RCG) FOR A COUNTRY HUT

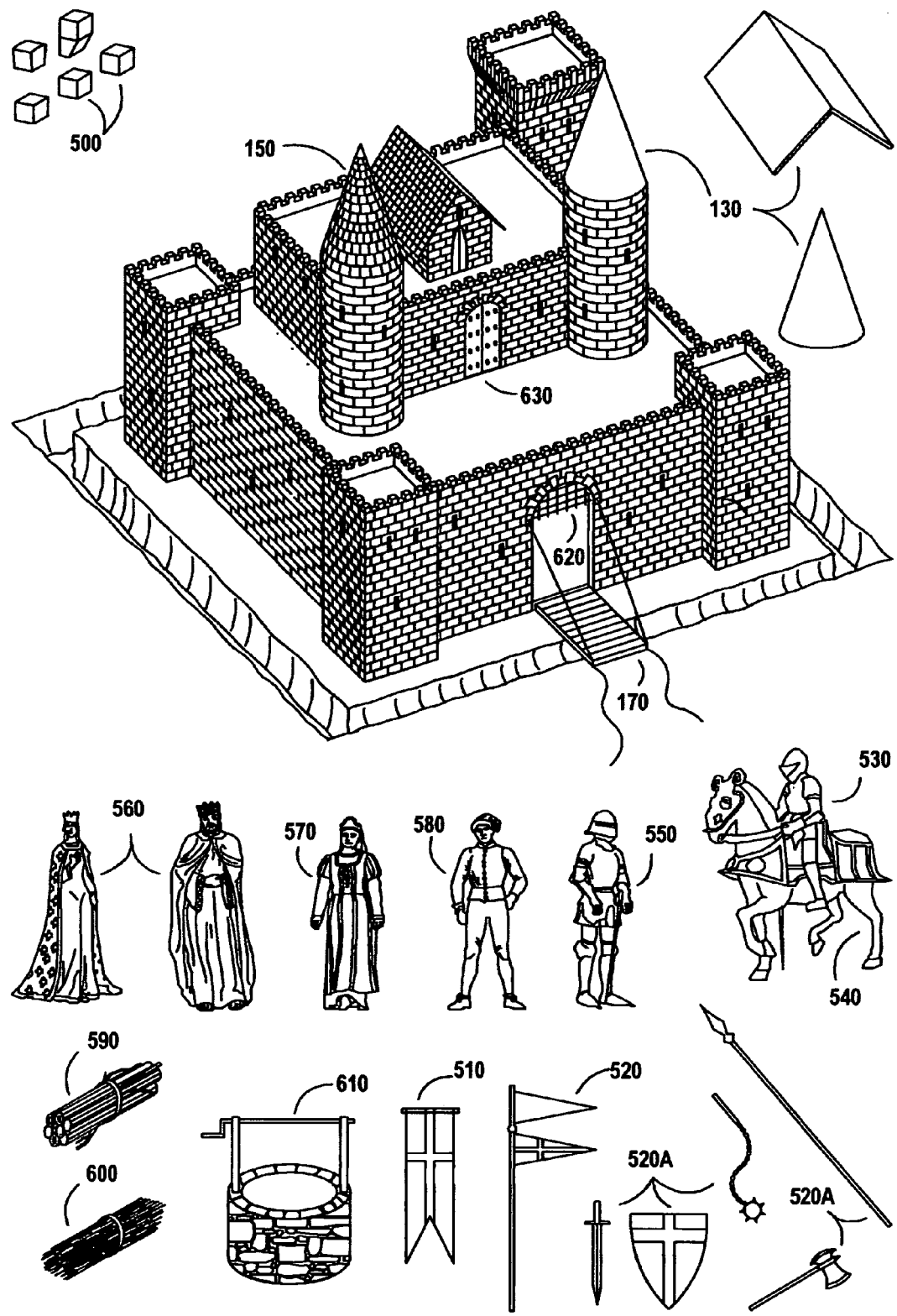
FIG. 4.- THE REAL CONSTRUCTION GAME (RCG) FOR A MEDIEVAL CASTLE

REAL CONSTRUCTION GAME (RCG)

BACKGROUND OF THE INVENTION

1. Field of the Invention

The present invention concerns the entertainment area. More particularly a game for kids and adults, and it is specifically in the group of puzzles to build game constructions.

2. Related Art of the Invention

The current games have one characteristic in common; they use many pieces to build, with different assembly ways that fit in the other compliment pieces. In this way you can build different models because the assembly is temporal not permanent. One good example of this game is the one called "Playgo". In general all existing games do not use any kind of mortar to join the elements.

SUMMARY OF THE INVENTION

An objective of the present invention is to provide a game to make buildings at a reduced scale providing the user all the necessary elements in order to obtain a sample at real scale.

For this purpose the game includes; rocks for the foundation, bricks, tiles, cement, sand, plaster, paint, columns, beams, timbers, doors, windows and all kind of accessories and tools required to build buildings. All these items are prepared to an adequate scale, taking special care on the correct ergonomic matter for an adequate use.

The game also includes a plan and instructions for the construction and all the materials are in enough quantity according to the floor plan.

Since real mortar is used for joining the elements, the construction is permanent showing a real sample of buildings.

The construction materials are different as long as it is decided to have a particular set; bricks, rocks, tiles, columns, beams, joining elements, cement, plaster and sand for a urban residence; stones, cement, sand, timbers and tiles for a medieval castle; rocks, sand, timbers, joining elements, wood tiles and trunks for a country hut. Tools and accessories are also included according to the style of the building.

The game is not only featured with the construction plan, but also with the level of difficulty decided. The number of tools and accessories vary according to the level and scale chosen for a particular game and also for the number of players.

BRIEF DESCRIPTION OF THE DRAWINGS

FIG. 1. Shows the Real Construction Game (RCG)

FIG. 2. Shows the Real Construction Game (RCG) for a brick and cement residence FIG. 3. Shows the Real Construction Game (RCG) for a country hut FIG. 4. Shows the Real Construction Game (RCG) for a medieval Castle.

DETAILED DESCRIPTION OF THE INVENTION

This game 10, called Real Construction Game (RCG), (FIG. 1), consists of building different kind of buildings at a reduced scale, reproducing them as real as it is possible at a real scale. For this purpose the game provides all the necessary elements for building the chosen sample, for example it provides: A floor plan 20, a set of instructions 30, materials, tools, and adequate accessories, at a reduced scale and at the adequate amount.

In order to build an urban residence (FIG. 2) the user must read the instructions 30, based on the floor plan 20, make the trace of the foundation in a small piece of land, dig the foundation, prepare the mortar mixing cement 40 and sand 50 with water, make the foundation with stones 60 and mortar, build up the columns 70 and start building the walls with clay bricks 80 or cement blocks 90 joined with the mix of cement and sand, leaving enough space for windows and doors, set the beams 120, set the interior elements, set the roof with the timbers provided 120A, the platform of the roof 130, the roof with the tiles 140 and the mortar and the wood tiles 150 set with nails 160. Set the doors and windows with their frames 140–140A, according to the floor plan 20 and the instructions 30 provided in the game. The roof cover will be provided with the shape required by the plan. The construction job will finish when you set the external accessories.

In order to build a country hut (FIG. 3), the user must read the instructions based on the floor plan, make the trace of the foundation in a small piece of land, dig the foundation, prepare the mortar mixing cement 40 and sand 50 with water, make the foundation with stones 60 and mortar, set the trunks 390 provided in the game, leaving the spaces for the windows and doors according to the floor plan, set the interior accessories, build the structure of the roof, the roof cover, the roof and set the doors 100 and windows 110 with their frames 140–140A. The construction job will finish when you set the external accessories.

In order to build a medieval castle (FIG. 4), the user must read the instructions based on the floor plan, make the trace of the foundation in a small piece of land, dig the foundation, prepare the mortar mixing cement 40 and sand 50 with water, make the foundation with stones 60 and mortar, start building by joining the rock blocks 500 with cement mortar and sand according to the floor plan, the structure of the roof will be built with the timbers 120 A, set the base of the roof 130, the roof with wood tiles 150 and joining elements 160, the drawbridge 170, the entry bars 620, interior doors 630 and the external accessories.

The game will be provided according to four different approaches:

1.—Type of edification
2.—Level of difficulty
3.—Level of detail of the edification
4.—Scale of the edification The first approach—Type of edification—Refers to three different kinds of edification:

Residences or brick and cement buildings
Country huts
Medieval castles

According to this approach, the materials and required accessories will be provided.

For houses and buildings of cement and bricks, some bricks and rocks will be included for the foundation 60. Bricks made out of clay 80, or cement blocks 90 for the walls, cement 40 and sand 50 to prepare the mortar, beams 120 and columns 70, made out of metal, wood or cement, frames for doors 140 and windows 140A, wooden doors 100, wooden windows with glass or acrylic 110, wooden timbers 120A prepared for the structure of the roof, fixation elements 160, elements of union 200A, a wooden cover or synthetic material 130 as a base to facilitate the installation of the tiles; made out of wood 150 or clay 140, the cement 40, the clinching 180, nails 160, hooks 190 or bolts 200 necessary according to the roof type.

The accessories for this type of building are the ones used in a real building. Room furniture, dining room, kitchen, bedroom, bathrooms, garage, living room furniture 210, coffee tables 220, lamps 230, pictures 240, stereo 250, television 260, dining room furniture 270, cabinets 280, dish cabinet 290, oven 300, extractor fun 310, sink 310A, refrigerator 320, crockery 330, bedroom furniture 340, bathroom fixture 350, mirror 360, automobiles 370, persons 370A, a dog 370B, illumination poles 380, wooden fence 380A, cement blocks or ornamental bricks for fences 380B.

For country huts; stones will be included 60, cement 40 and sand 50 for the foundation, trunks 390 for the walls, white cement or common cement for the trunks, wooden door frames 140, wooden doors 400 and wooden windows with glass or acrylic 140A, wooden timbers 120A prepared for the structure of the roof, elements of union 200A, a wooden cover or synthetic material as roof cover 130 to facilitate the installation of wooden tiles 150 or clay 140, the clinching 180, nails 160 bolts 200 or hooks 190 necessary according to the tile type to be used. Also, the stone, sand and necessary cement for the construction of a chimney.

The accessories for this type of building are also the ones used in a country hut: Rustic furniture of dining room 410 and bedroom 420, kitchen utensils 430 appropriate for the preparation of foods in the chimney, fishing set 440, a boat 450, weapons 460, hunting and camping equipment 470, small scale animals 480, woodmen 480A and vegetation 490.

For the medieval castles stone will be included 60, sand 50 and cement 40 for the foundations, stone prepared in blocks 500 for the construction according to the floor plan, that is, cut at an appropriate scale and shape, timbers 120A for the frame of the roof, elements of union, a synthetic base for the roof cover 130 to facilitate the installation of wooden tiles 150, the clinching 180, nails 160 and hooks 190 necessary for the installation of the tiles, a fence for the entrance 620, interior doors 630, a complete drawbridge 170. Eventually, the roof will be provided for packages of less construction difficulty.

The accessories for this type of building are the ones used in the time of those kinds of buildings like: Flags 510, flagpole 520, weapons 520A, soldiers at an appropriate scale 530, harnessed horses 540, soldiers in armors 550, kings 560, noblemen 570 and residents 580, firewood faces 590 and straw 600, a well of water 610.

The second approach—degree of difficulty—refers to the complexity of the building plan and its size.

The third approach—degree of detail—refers to the level of decor of the building: If it includes a wall cover with plaster, painting, bathroom fixture, sinks, kitchen cabinets, chimney, furniture, appliances, crockery, lamps and others and, according to this approach, the set will provide different materials and additional accessories.

The fourth approach—scale of the construction—refers to the scale of the game. Not all the sets will be provided at the same scale.

The game will be given in modules that combine the different approaches, keeping in mind the age of the users that it is directed.

In the container 620 it will be specified the content of each container, according to the combination of the described approaches, as well as a specification suggested about the age of the user to whom it is directed and also a warning about the eventual need of adult supervision.

The materials will be provided reproducing the way it is real: The cement, sand and plaster 50A in labeled bags, the paintings 50B in labeled plastic pails showing the color, the bricks and encased accessories and the tools properly conditioned.

According to the specifications of the package, the tools will be provided in an adequate quantity and diversity. The basic module will include two shovels 630, two picks 640, a metric tape 650, a level 660, a hammer 670, pliers 680, cord 690, stakes 700, a plumb line 710, two trowels 720, two bricklayer irons 730 and two metal sticks 640A. The basic module of tools will increase according to the complexity of the package, it will be possible to add brushes 730A, saws for wood 740, smoothing ruler 750, a manual or electric cement mixing machine 760, wheelbarrows 770, vats 780.

The tools will be manufactured to reduced scale, without losing ergonomics, that is, they will have a size and handles that will allow their manipulation with comfort, without losing aestheticism.

A game of construction named Real Construction Game (RCG), which consists of building different types of buildings at scale, reproducing as much as possible the way the real constructions take place. For this purpose, the set provides all the necessary elements for the construction of the building specified in each package like: A floor plan, a sheet of instructions, the corresponding materials, the necessary tools and the appropriate accessories, everything reduced to the adequate scale and in the necessary quantity. To make the construction of a specific sample, the user will have to read the instructions based on the plan, to make the layout of the foundation in a small piece of land, dig the gutters for the foundations, prepare the mortar mixing cement and sand with water, make the foundation with stone and mortar, set the columns, build the walls with bricks of clay or cement blocks together with the mortar and sand, leaving the necessary spaces for doors and windows. Then install the beams, set the interior accessories, build the structure that supports the roof with the wooden timbers and the elements of union, the roof cover, the roof with clay tiles and mortar or wooden tiles installed with fixation elements like nails, bolts or clinching. The last part is to install the doors and windows with their frames, everything according to the floor plan and the instructions provided in the package. The roof cover will be provided with the required shape drawn in the floor plan. The construction will finish installing the corresponding external accessories.

For houses and buildings of cement and bricks, some stones will be included for the foundation. Bricks made out of clay or cement blocks for the walls, cement and sand to prepare the mortar, beams and columns, made out of metal, wood or cement, frames for doors and windows, wooden doors, wooden windows with glass or acrylic, wooden timbers prepared for the structure of the roof, fixation elements, elements of union, a wooden cover or synthetic material as a base to facilitate the installation of the tiles; made out of wood or clay, the cement, the clinching, nails, hooks or bolts necessary according to the roof type.

The accessories for this type of building are the ones used in a real building. Room furniture, dining room, kitchen, bedroom, bathrooms, garage, living room furniture, coffee tables, lamps, pictures, stereo, television, dining room furniture, cabinets, dish cabinet, oven, extractor fun, sink, refrigerator, crockery, bedroom furniture, bathroom fixture, mirror, automobiles, illumination poles, wooden fence, cement blocks or ornamental bricks for fences.

For country huts; stones will be included, cement and sand for the foundation, trunks for the walls, white cement or common cement for the trunks, wooden door frames, wooden doors and wooden windows with glass or acrylic, wooden timbers, prepared for the structure of the roof, elements of union, a wooden cover or synthetic material as a roof cover to facilitate the installation of wooden tiles or clay, the clinching, nails bolts or hooks necessary according to the tile type to be used. Also, the stone, sand and necessary cement for the construction of a chimney.

The accessories for this type of building are also the ones used in a country hut: Rustic furniture of dining room and bedroom, kitchen utensils appropriate for the preparation of foods in the chimney, fishing set, a boat, weapons, hunting and camping equipment, small scale animals and vegetation.

For the medieval castles stones will be included, sand and cement for the foundations, stone prepared in blocks for the construction according to the floor plan, that is, cut at an appropriate scale and shape, timbers for the frame of the roof, elements of union, a synthetic base as a roof cover to facilitate the installation of wooden tiles, the clinching, nails and hooks necessary for the installation of the tiles, a fence for the entrance, interior doors, a complete drawbridge. Eventually, the roof will be provided for packages of less construction difficulty.

The accessories for this type of building are the ones used in the time of those kinds of buildings like: Flags, flagpole, weapons, soldiers at an appropriate scale, harnessed horses, soldiers in armors, kings, noblemen and residents, firewood faces and straw, a well of water.

The second approach—degree of difficulty—refers to the complexity of the building plan and the size of the building.

The third approach—degree of detail—refers to the level of decor of the building: If it includes a wall cover with plaster, painting, bathroom fixture, sinks, kitchen cabinets, chimney, furniture, appliances, crockery, lamps and others. According to this approach the set will provided different materials and additional accessories.

The fourth approach—scale of the construction—refers to the scale of the game. Not all the sets will be provided at the same scale.

The game will be given in modules that combine the different approaches, keeping in mind the age of the users that it is directed.

In the container it will be specified the content of each container, according to the combination of the described approaches, as well as a specification suggested about the age of the user to whom it is directed and also a warning about the eventual need of adult supervision.

The materials will be provided reproducing the way the construction is built. The cement, sand and plaster in labeled bags, the paintings in labeled plastic pails showing the color, the bricks and encased accessories and the tools properly conditioned.

According to the specifications of the package, the tools will be provided in an adequate quantity and diversity. The basic module will include two shovels, two picks, a metric tape, a level, a hammer, pliers, cord, stakes, a plumb line, two trowels, two bricklayer irons and two metal sticks. The basic module of tools will increase according to the complexity of the package, it will be possible to add brushes, saws for wood, smoothing ruler, a manual or electric cement mixing machine, wheelbarrows, vats.

The tools will be manufactured to a reduced scale, without losing ergonomics, that is, they will have a size and handles that will allow their manipulation with comfort, without losing aestheticism.

While embodiments of this invention are illustrated and disclosed, these embodiments should not be construed to limit the claims. It is anticipated that various modifications and alternative designs may be made without departing from the scope of this invention.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A game for constructing a scenario at reduced scale comprising:
   a floor plan,
   a set of instructions,
   construction materials,
   at least one tool, and
   at least one accessory,
wherein the construction materials comprise:
   a) cement and sand, wherein the cement and sand are mixed with water to form a mortar mixture; and
   b) at least one of bricks, tiles, clays, plasters, rocks, beams, cement blocks, columns, woods, and roof covers;
wherein the scenario is constructed by joining the at least one of bricks, tiles, clay, plaster, rocks, beams, cement blocks, nails, hooks, bolts, columns, wood, and roof cover using the mortar mixture;
wherein the scenario is a permanent structure;
wherein the construction materials, the tools, and the accessories are reduced to a predetermined scale;
wherein the construction materials, the tools, and the accessories are made of standard materials used for the conventional materials they are representing; and
wherein the game is packaged on a module, wherein the module includes the construction materials, tools, and accessories in amount sufficient to form the specific reduced scale scenario.

2. The construction game according to claim 1 wherein the accessories are chosen from frames for doors and windows, doors, windows, roofs, metal, fixation elements, elements of union, furniture, appliances, lamps, pictures, stereos, televisions, cabinets, dishes, ovens, extractors, sinks, refrigerators, garage door, crockery, bathroom fixtures, mirrors, automobiles, illumination poles, fences, kitchen utensils, fishing sets, boats, weapons, hunting and camping equipments, animals, vegetations, flags, flagpole, soldiers, harnessed horses, armors, kings, noblemen and residents, firewood faces and straw, a well of water, wall cover papers, paint, chimney, or combination thereof.

3. The construction game according to claim 1 wherein tools are chosen from shovels, picks, metric tapes, levels, hammers, pliers, cords, stakes, plumb lines, trowels, bricklayer irons, metal sticks, brushes, saws for wood, smoothing rulers, a manual or electric cement mixing machines, wheelbarrows, vats, rolls, or combination thereof.

4. The construction game according to claim 1 wherein the scenario is a country hut.

5. The construction game according to claim 1 wherein the scenario is a medieval castle.

6. The construction game according to claim 1 wherein the scenario is a building chosen from a sky-scraper or an office building.

7. The construction game according to claim 1 wherein the scenario is a community building chosen from a city hall, a council or a hospital.

8. The construction game according to claim 1 wherein the scenario is a building of service chosen like a rail station, an airport, or a gas station.

9. The construction game according to claim 1 wherein the scenario is a farm house for cattle breeding.

10. A method for building a reduced scale scenario, the method comprising:
   1) providing a module comprising:
      a floor plan,
      a set of instructions,
      construction materials,
      tools, and
      accessories,
   wherein the construction materials comprise:
      a) cement and sand, wherein the cement and sand are mixed with water to form a mortar mixture;
      b) at least one of bricks, tiles, clay, plaster, rocks, beams, cement blocks, columns, wood, and roof cover;
   2) building a foundation on a small piece of land according to the floor plan by digging gutters for the foundations; and
   3) building the reduced scale scenario by joining the construction materials with the mortar mixture according to the floor plan;
   wherein the scenario is a permanent structure; and
   wherein the construction materials, the tools, and the accessories are reduced to a predetermined scale.

11. The method according to claim 10 further comprising the step of installing the accessories;
   wherein the accessories are chosen from frames for doors and windows, doors, windows, roofs, metal, fixation elements, elements of union, furniture, appliances, lamps, pictures, stereos, televisions, cabinets, dishes, ovens, extractors, sinks, refrigerators, crockery, bathroom fixtures, mirrors, automobiles, illumination poles, fences, kitchen utensils, fishing sets, boats, weapons, hunting and camping equipments, animals, vegetations, flags, flagpole, soldiers, harnessed horses, armors, kings, noblemen and residents, firewood faces and straw, a well of water, wall cover papers, paint, chimney, or combination thereof.

* * * * *